United States Patent
Ueda et al.

(10) Patent No.: US 8,097,372 B2
(45) Date of Patent: Jan. 17, 2012

(54) FUEL CELL SYSTEM AND METHOD OF STARTING OPERATION OF THE FUEL CELL SYSTEM

(75) Inventors: Kenichiro Ueda, Utsumomiya (JP); Junji Uehara, Utsunomiya (JP); Yuji Matsumoto, Tochigi-ken (JP)

(73) Assignee: Honda Motor Co., Ltd., Tokyo (JP)

(*) Notice: Subject to any disclaimer, the term of this patent is extended or adjusted under 35 U.S.C. 154(b) by 483 days.

(21) Appl. No.: 12/410,326

(22) Filed: Mar. 24, 2009

(65) Prior Publication Data
US 2009/0239109 A1    Sep. 24, 2009

(30) Foreign Application Priority Data
Mar. 24, 2008 (JP) .................. 2008-076019

(51) Int. Cl.
*H01M 8/06* (2006.01)
(52) U.S. Cl. ...................... 429/415; 429/444
(58) Field of Classification Search .......... 429/415, 429/408, 442, 444
See application file for complete search history.

(56) References Cited

U.S. PATENT DOCUMENTS

| | | | |
|---|---|---|---|
| 7,867,661 B2* | 1/2011 | Ogawa et al. | 429/429 |
| 7,897,286 B2* | 3/2011 | Uehara et al. | 429/408 |
| 2007/0026277 A1 | 2/2007 | Ogawa et al. | |
| 2007/0077472 A1* | 4/2007 | Uehara et al. | 429/25 |
| 2007/0092771 A1* | 4/2007 | Wake et al. | 429/22 |
| 2007/0111050 A1* | 5/2007 | Matsumoto et al. | 429/17 |
| 2009/0162710 A1* | 6/2009 | Kajiwara | 429/22 |

FOREIGN PATENT DOCUMENTS

| | | |
|---|---|---|
| JP | 11-97047 | 4/1999 |
| JP | 2004-22460 | 1/2004 |
| JP | 2004-172047 | 6/2004 |
| JP | 2007-35509 | 2/2007 |
| JP | 2007-59348 | 3/2007 |
| JP | 2007-165018 | 6/2007 |
| JP | 2007-257956 | 10/2007 |
| JP | 2007-317363 | 12/2007 |
| JP | 2008-59828 | 3/2008 |

OTHER PUBLICATIONS

Eda, Nobuo, Battery Application Handbook, 2nd Edition, pp. 348-349 (2005).
Japanese Office Action for Application No. 2008-076019, dated Feb. 2, 2010.

* cited by examiner

*Primary Examiner* — Hae Moon Hyeon
(74) *Attorney, Agent, or Firm* — Nelson Mullins Riley & Scarborough LLP; Anthony A. Laurentano (57) ABSTRACT

A controller of a fuel cell system includes an anode gas replacement apparatus, a stoppage time detection apparatus, and a cathode gas flow rate control apparatus. The anode gas replacement apparatus replaces hydrogen in an anode gas channel using an anode gas supply apparatus. The stoppage time detection apparatus detects a stoppage time during which operation of the fuel cell stack is stopped. When the anode gas replacement apparatus replaces the hydrogen, the cathode gas flow rate control apparatus changes the flow rate of the cathode gas supplied from the cathode gas supply apparatus depending on the stoppage time.

21 Claims, 11 Drawing Sheets

FUEL CELL SYSTEM AND METHOD OF STARTING OPERATION OF THE FUEL CELL SYSTEM

BACKGROUND OF THE INVENTION

1. Field of the Invention

The present invention relates to a fuel cell system including a fuel cell, a cathode gas supply apparatus, an anode gas supply apparatus, an anode gas replacement apparatus, and a dilution apparatus. Further, the present invention relates to a method of starting operation of the fuel cell system.

2. Description of the Related Art

Fuel cells are systems for obtaining direct current electrical energy by electrochemical reactions of an anode gas (chiefly hydrogen-containing gas) supplied to an anode and a cathode gas (chiefly oxygen-containing gas) supplied to a cathode.

For example, a solid polymer electrolyte fuel cell includes a power generation cell formed by sandwiching a membrane electrode assembly between separators. The membrane electrode assembly includes the anode, the cathode, and an electrolyte membrane interposed between the anode and the cathode. The electrolyte membrane is a polymer ion exchange membrane. In use of this type of power generation cell, generally, predetermined numbers of the membrane electrode assemblies and separators are stacked alternately to form a fuel cell stack, and the fuel cell stack is mounted in a vehicle such as an automobile.

In the fuel cell of this type, when power generation (operation) is stopped, supply of the anode gas and the cathode gas to the fuel cell is stopped. However, some anode gas remains at the anode, and some cathode gas remains at the cathode. Therefore, while operation of the fuel cell is stopped, the cathode gas (air) from the cathode moves through the electrolyte membrane to the anode, and thus, the cathode gas is present at both of the cathode and the anode.

In this regard, a method of starting operation of a fuel cell apparatus disclosed in Japanese Laid-Open Patent Publication No. 11-097047 is known. This conventional technique is intended to provide a method of starting operation of the fuel cell apparatus in which operation of the fuel cell apparatus is restarted rapidly even if power generation is stopped for long time. The technique relates to a method of starting operation of a sealed hydrogen type fuel cell apparatus including a fuel cell body, a hydrogen storage tank for storing (occluding) hydrogen required for the fuel cell body, a pressure control unit for controlling the pressure of the hydrogen supplied from the hydrogen storage tank to the fuel cell body, a hydrogen control valve for controlling the flow of the hydrogen, air supply means for supplying oxygen required for power generation of the fuel cell to the fuel cell body, a control unit for controlling the air supply means, a discharge valve provided on the anode side of the fuel cell, a switch for controlling an external output from the fuel cell body, and a control unit for monitoring the output voltage of the fuel cell and controlling the discharge valve and the switch.

At the time of starting operation of the fuel cell body, the hydrogen control valve for controlling the flow of the hydrogen from the hydrogen storage tank is opened. Then, in response to a signal from the control unit for controlling the air supply means, the air supply means supply the air to the fuel cell body. Then, the discharge valve is opened. After the output voltage of the fuel cell becomes a certain voltage or more, in response to a signal from the control unit for controlling the discharge valve, the discharge valve is closed to start the external output.

In the above conventional technique, after the pressure on the anode side is increased by opening the hydrogen control valve, the air is supplied to the fuel cell, and then, the discharged valve is opened to discharge the remaining gas which does not induce reaction. At this time, the hydrogen as the anode gas cannot be discharged directly, and needs to be diluted with the air as the cathode gas.

In this case, the amount of hydrogen discharged from the fuel cell through the discharge valve is subject to change depending on the change in a stoppage time (i.e., a period of time from stopping of operation of the fuel cell system to starting of operation of the fuel cell system). It is because, the anode gas is consumed by chemical reaction when operation is stopped, and the amount of the remaining hydrogen is reduced due to out-leakage or cross-leakage.

However, in the above conventional technique, regardless of change in the amount of the remaining hydrogen, the amount of the air for diluting the hydrogen discharged from the fuel cell is regulated to the maximum amount which is required for dilution. Therefore, at the time of diluting the hydrogen, the air is supplied excessively, and consumption of energy needed for operating the compressor (pump) is increased uneconomically.

SUMMARY OF THE INVENTION

The present invention has been made to solve the problem of this type, and an object of the present invention is to provide a fuel cell system and a method of starting operation of the fuel cell system in which energy consumption at the time of dilution is suitably reduced, and operation of the fuel cell system is started economically.

The prevent invention relates to a fuel cell system including a fuel cell for generating electricity by electrochemical reactions of a cathode gas supplied to a cathode gas channel and an anode gas supplied to an anode gas channel, a cathode gas supply apparatus for supplying the cathode gas, an anode gas supply apparatus for supplying the anode gas, an anode gas replacement apparatus for replacing the anode gas in the anode gas channel by the anode gas supply apparatus at the time of starting operation of the fuel cell, and a dilution apparatus for diluting an anode off gas discharged from the fuel cell by mixing the anode off gas with the cathode gas supplied from the cathode gas supply apparatus.

Further, the fuel cell system includes a stoppage time detection apparatus for detecting a stoppage time during which operation of the fuel cell is stopped, and a cathode gas flow rate control apparatus for changing the flow rate of the cathode gas supplied from the cathode gas supply apparatus depending on the stoppage time, at the time of replacing the anode gas by the anode gas replacement apparatus.

Further, the present invention relates to a method of starting operation of a fuel cell system including a fuel cell for generating electricity by electrochemical reactions of a cathode gas supplied to a cathode gas channel and an anode gas supplied to an anode gas channel, a cathode gas supply apparatus for supplying the cathode gas, an anode gas supply apparatus for supplying the anode gas, an anode gas replacement apparatus for replacing the anode gas in the anode gas channel by the anode gas supply apparatus at the time of starting operation of the fuel cell, and a dilution apparatus for diluting an anode off gas discharged from the fuel cell by mixing the anode off gas with the cathode gas supplied from the cathode gas supply apparatus.

The method includes the steps of detecting a stoppage time during which operation of the fuel cell is stopped, and changing the flow rate of the cathode gas supplied from the cathode gas supply apparatus depending on the stoppage time, at the time of replacing the anode gas by the anode gas replacement apparatus.

In the present invention, at the time of starting operation of the fuel cell, the flow rate of the cathode gas supplied from the cathode gas supply apparatus is changed depending on the stoppage time. Therefore, the flow rate of the cathode gas is regulated such that the anode gas can be diluted, depending on the change in the amount of the anode gas remaining in the fuel cell.

Accordingly, since the cathode gas is regulated so that the anode gas actually remaining in the fuel cell can be diluted suitably, the cathode gas supply apparatus is not operated unnecessarily. Thus, energy consumption is suitably controlled economically.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENT

Figure 1:
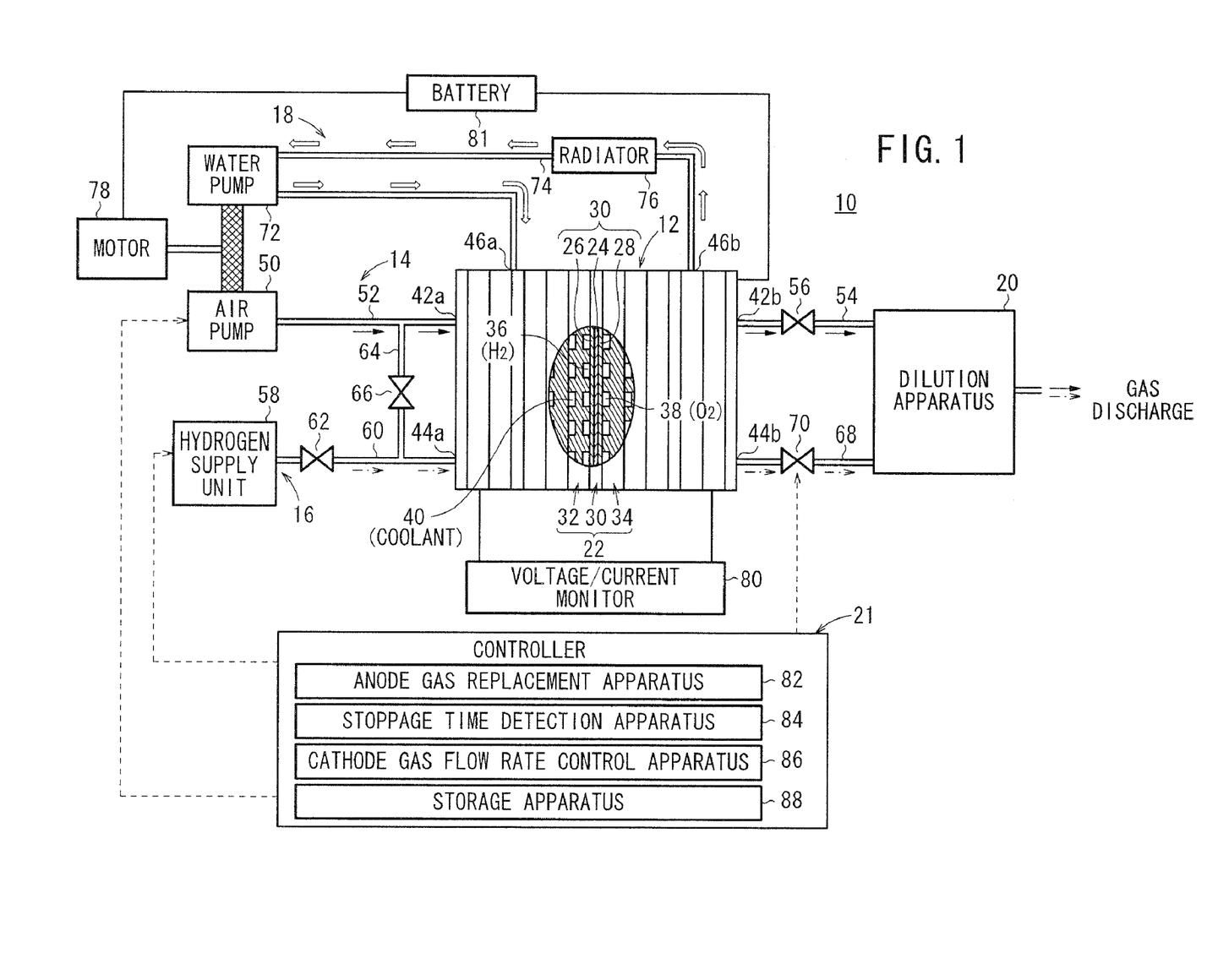
FIG. 1 is a diagram schematically showing structure of a fuel cell system for carrying out a method of starting operation according to a first embodiment of the present invention.

FIG. 1 is a diagram schematically showing structure of a fuel cell system 10 for carrying out a method of starting operation according to a first embodiment of the present invention.

The fuel cell system 10 includes a fuel cell stack 12, a cathode gas supply apparatus 14 for supplying a cathode gas such as an oxygen-containing gas (hereinafter simply referred to as the air) to the fuel cell stack 12, an anode gas supply apparatus 16 for supplying an anode gas such as a hydrogen-containing gas (hereinafter simply referred to as the hydrogen) to the fuel cell stack 12, a coolant supply apparatus 18 for supplying a coolant to the fuel cell stack 12, a dilution apparatus 20 for diluting an anode off gas discharged from the fuel cell stack 12 by mixing it with the air supplied from the cathode gas supply apparatus 14, and a controller 21. A cathode off gas discharged from the fuel cell stack 12 is discharged to the dilution apparatus 20. Alternatively, for diluting the anode off gas, the air may be directly supplied to the dilution apparatus 20 bypassing the fuel cell stack 12.

The fuel cell stack 12 is formed by stacking a plurality of fuel cells 22. Each of the fuel cells 22 includes a membrane electrode assembly 30 and a pair of separators 32, 34 sandwiching the membrane electrode assembly 30. The membrane electrode assembly 30 includes an anode 26, a cathode 28, and a solid polymer electrolyte membrane 24 interposed between the anode 26 and the cathode 28.

The separator 32 has an anode gas channel 36 for supplying the hydrogen to the anode 26, and the separator 34 has a cathode gas channel 38 for supplying the air to the cathode 28. A coolant channel 40 for adjusting the temperature is formed between the separators 32, 34.

A cathode gas supply passage 42a for supplying the air and an anode gas supply passage 44a for supplying hydrogen are provided at one end of the fuel cell stack 12. A cathode gas discharge passage 42b for discharging the air and an anode gas discharge passage 44b for discharging the hydrogen are provided at the other end of the fuel cell stack 12.

Further, the fuel cell stack 12 has a coolant supply passage 46a for supplying the coolant such as pure water or ethylene glycol and a coolant discharge passage 46b for discharging the coolant.

The cathode gas supply passage 42a and the cathode gas discharge passage 42b are connected to the cathode gas channel 38 of each fuel cell 22, and the anode gas supply passage 44a and the anode gas discharge passage 44b are connected to the anode gas channel 36 of each fuel cell 22. The coolant supply passage 46a and the coolant discharge passage 46b are connected to the coolant channel 40 of each fuel cell 22.

The cathode gas supply apparatus 14 has an air pump 50 for compressing the atmospheric air from the outside, and supplying the compressed air to the fuel cell stack 12. The air pump 50 is provided in an air supply channel 52. The air supply channel 52 is connected to a cathode gas supply passage 42a of the fuel cell stack 12. The cathode gas supply apparatus 14 has an air discharge channel 54 connected to the cathode gas discharge passage 42b. The air discharge channel 54 is connected to the dilution apparatus 20 through a purge valve 56.

The anode gas supply apparatus 16 includes a hydrogen supply unit 58 having a hydrogen tank for storing a high pressure hydrogen (hydrogen-containing gas). The hydrogen supply unit 58 is connected to the anode gas supply passage 44a of the fuel cell stack 12 through a hydrogen supply channel 60. An open/close valve 62 is provided in the hydrogen supply channel 60, and a bypass channel 64 is connected to the hydrogen supply channel 60 and the air supply channel 52. An open/close valve 66 is provided in the bypass channel 64.

The anode gas supply apparatus 16 includes a hydrogen discharge channel 68 connected to the anode gas discharge passage 44b. The hydrogen discharge channel 68 is connected to the dilution apparatus 20 through a purge valve 70.

The coolant supply apparatus 18 has a water pump 72, and the water pump 72 is connected to the coolant supply passage 46a and the coolant discharge passage 46b of the fuel cell stack 12 through a coolant circulation channel 74. A radiator 76 is provided in the coolant circulation channel 74.

The air pump 50 of the cathode gas supply apparatus 14 and the water pump 72 of the coolant supply apparatus 18 are coaxially coupled to a single motor 78, and are operated coaxially. A voltage/current monitor 80 for monitoring voltage and current at the time of power generation is connected to the fuel cell stack 12. The fuel cell stack 12 is connected to an energy storage such as a battery 81, and the battery 81 is capable of supplying electrical energy to the motor 78 or the like.

The controller 21 includes an anode gas replacement apparatus 82, a stoppage time detection apparatus 84, a cathode gas flow rate control apparatus 86, and a storage device 88. The anode gas replacement apparatus 82 replaces the hydrogen in the anode gas channel 36 by the anode gas supply apparatus 16. The stoppage time detection apparatus 84 detects a stoppage time (i.e., a period of time from stopping of operation of the fuel cell system to starting of operation of the fuel cell system) during which operation of the fuel cell stack 12 is stopped. The cathode gas flow rate control apparatus 86 changes the flow rate of the cathode gas supplied from the cathode gas supply apparatus 14 depending on the stoppage time at the time of replacing the hydrogen by the anode gas replacement apparatus 82. The storage device 88 stores data such as a control map as descried later.

Figure 2:
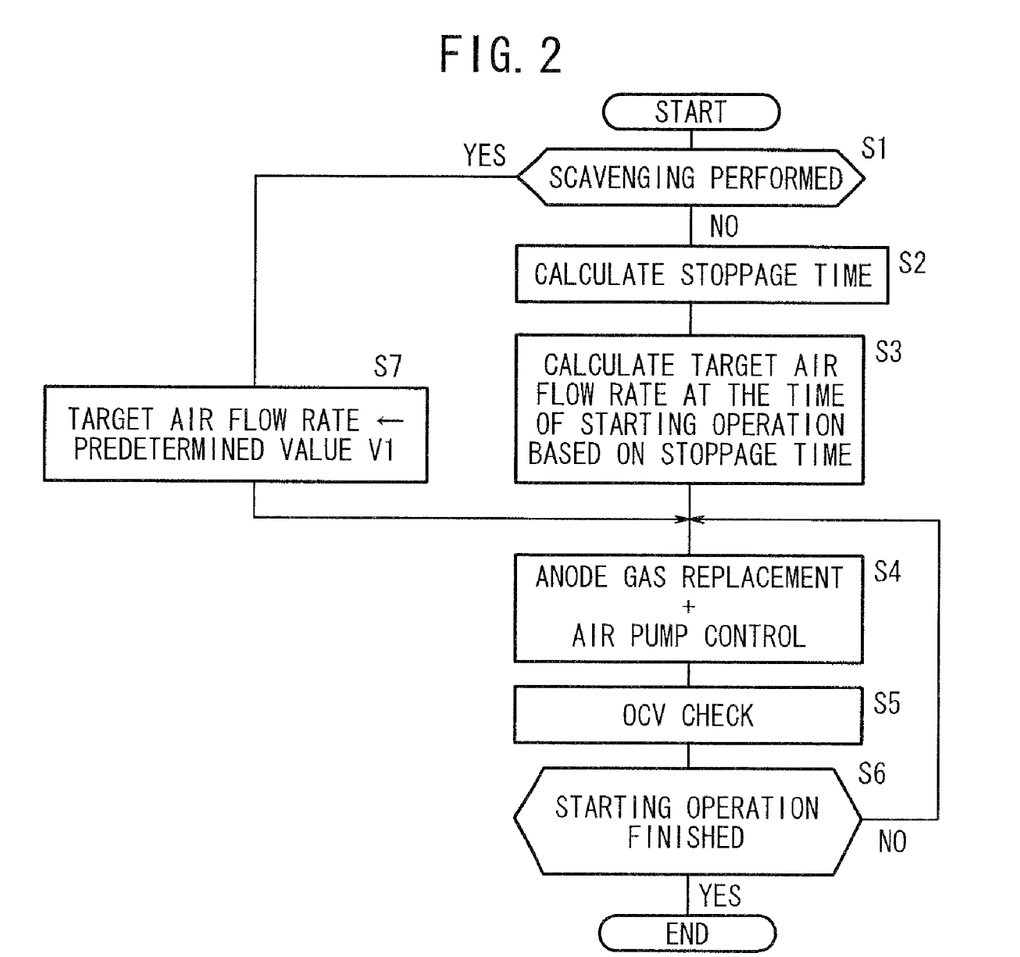
FIG. 2 is a flow chart showing the operation starting method.

Next, operation of the fuel cell system 10 will be descried with reference to a flow chart in FIG. 2.

In the state where operation of the fuel cell system 10 is stopped, i.e., during stoppage of the fuel cell system 10, for starting operation of the fuel cell system 10, firstly, it is determined whether scavenging of the anode gas channel 36 using the air (cathode gas) has been performed or not during stoppage (step S1). If it is determined that scavenging using the cathode gas has not been performed during stoppage (NO in step S1), the process proceeds to step S2, and the stoppage time detection apparatus 84 calculates a stoppage time, e.g., using a timer (not shown).

Then, the process proceeds to step S3, and the target air flow rate (cathode gas flow rate) at the time of starting operation is calculated based on the calculated stoppage time. The controller 21 has data of the control map indicating the correspondence between the stoppage time and the air flow rate in the storage device 88 beforehand.

In the first embodiment (and also in a second embodiment as described later), at the time of open circuit voltage (OCV) purging, all of the gas in the anode fuel gas channel system (the anode gas supply passage 44*a*, the anode gas channel 36, and the anode gas discharge passage 44*b*) is replaced with the anode gas.

Figure 3:
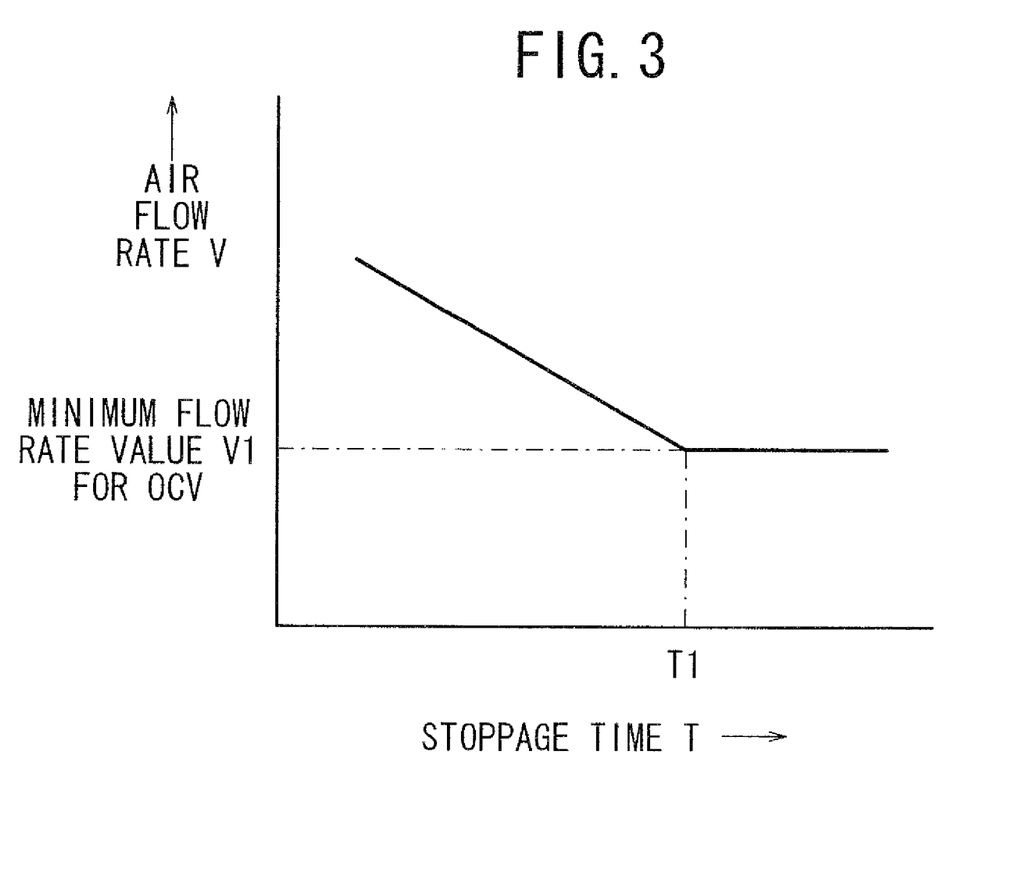
FIG. 3 is a control map showing the correspondence between the stoppage time and the air flow rate.

Therefore, in the control map, as shown in FIG. 3, as the stoppage time is reduced, the flow rate of the air is increased. When the stoppage time exceeds predetermined time T1 (several hours), the flow rate of the air is set to a minimum flow rate value V1 which is required at the time of OCV. It is because, if the stoppage time is short, the amount of hydrogen remaining in the anode gas channel system is large. Therefore, the amount of hydrogen discharged at the time of gas replacement by OCV purging is increased, and accordingly the flow rate of the air needs to be increased. It should be noted that the minimum flow rate value V1 is the same as the predetermined value V1 in the case where scavenging is performed during stoppage as described later.

Then, based on the target air flow rate calculated in step S3, the cathode gas flow rate control apparatus 86 controls the air pump 50 of the cathode gas supply apparatus 14, and operates the hydrogen supply unit 58 of the anode gas supply apparatus (step S4).

In the anode gas supply apparatus 16, as shown in FIG. 1, by opening the open/close valve 62, the hydrogen supplied from the hydrogen supply unit 58 passes through the hydrogen supply channel 60, and the hydrogen is supplied to the anode gas supply passage 44*a* of the fuel cell stack 12. The hydrogen supplied to the anode gas supply passage 44*a* flows into the anode gas channel 36, and flows along the electrode surface of the anode 26 of each fuel cell 22. Thereafter, the hydrogen is discharged to the anode gas discharge passage 44*b*.

Thus, the remaining gas (including the hydrogen) remaining in the anode gas channel system (the anode gas supply passage 44*a*, the anode gas channel 36, and the anode gas discharge passage 44*b*) of the fuel cell stack 12 is replaced with fresh hydrogen. By opening the purge valve 70, the remaining gas and the fresh hydrogen (anode off gas) are supplied into the dilution apparatus 20 through the hydrogen discharge channel 68.

In the meanwhile, in the cathode gas supply apparatus 14, by electrical energy supplied from the battery 81, the motor 78 is rotated, and operation of the air pump 50 is started. The compressed air supplied from the air pump 50 is supplied to the cathode gas supply passage 42*a* of the fuel cell stack 12 through the air supply channel 52.

In each fuel cell 22 of the fuel cell stack 12, the air supplied to the cathode gas supply passage 42*a* flows into the cathode gas channel 38, and then flows along the electrode surface of the cathode 28. Thereafter, the air is discharged to the cathode gas discharge passage 42*b*. By opening the purge valve 56, the air (cathode off gas) is supplied into the dilution apparatus 20 through the air discharge channel 54.

In the first embodiment, as shown in FIG. 3, the control map defining the correspondence between the stoppage time and the flow rate of the air beforehand is provided. In accordance with the control map, the target air flow rate at the time of starting operation is determined.

In the fuel cell stack 12, as the stoppage time is longer, more hydrogen is consumed by the electrochemical reaction, and also the amount of the remaining hydrogen is reduced by out-leakage, cross-leakage or the like. Therefore, as the stoppage time is increased, by reducing the air flow rate at the time of starting operation, the air flow rate is regulated to a suitable amount for sufficiently diluting the hydrogen actually remaining in the fuel cell stack 12.

Therefore, the air pump 50 of the cathode gas supply apparatus 14 is not operated unnecessarily. Thus, electrical energy supplied to the motor 78 for operating the air pump 50 is reduced, and energy consumption of the battery 81 is suitably controlled economically.

In the coolant supply apparatus 18, by rotation of the motor 78, the water pump 72 and the air pump 50 are operated coaxially. The coolant supplied to the coolant circulation channel 74 by the water pump 72 flows from the coolant supply passage 46*a* of the fuel cell stack 12 to the coolant channel 40. After the coolant cools each of the fuel cells 22, the coolant is discharged from the coolant discharge passage 46*b* to the coolant circulation channel 74.

Then, the process proceeds to step S5 for detecting OCV of the fuel cell stack 12 through the voltage/current monitor 80. When OCV detected by the voltage/current monitor 80 reaches the predetermined value, and/or when predetermined time has elapsed after starting operation of the fuel cell stack 12, it is determined that the process of starting operation of the fuel cell stack 12 has been finished (YES in step S6).

In step S1, if it is determined that scavenging of the anode gas channel 36 has been performed using the air during stoppage (YES in step S1), the process proceeds to step S7, and the target air flow rate at the time of starting operation is set to the predetermined value, i.e., the minimum flow rate value V1 for OCV.

At the time of scavenging of the anode gas channel 36 by the air, the open/close valve 62 is closed, the open/close valve 66 is opened, the purge valve 56 is closed, and the purge valve 70 is opened. In this state, the air pump 50 is operated by the motor 78. Thus, the external air is supplied from the air supply channel 52 through the bypass channel 64 to the anode gas supply passage 44a of the fuel cell stack 12. By the air supplied from the anode gas supply passage 44a to the hydrogen supply channel 60, the gas remaining in the anode gas channel system of the fuel cell stack 12 is discharged from the hydrogen discharge channel 68 to the dilution apparatus 20.

As described above, since scavenging of the anode gas channel system is performed using the air, at the time of anode gas replacement in step S4, the amount of hydrogen remaining in the anode gas channel system is reduced significantly. Therefore, it is only necessary to supply the air in the amount corresponding to the minimum flow rate value V1 for OCV checking, and energy consumption is reduced effectively.

Further, in the first embodiment, the air pump 50 and the water pump 72 are coaxially operated by the motor 78. Therefore, in the case where the stoppage time is long, and the rotation number of the air pump 50 is small, the rotation number of the water pump 72 is also decreased, and the flow rate of the coolant is decreased. Thus, warming up operation of the fuel cell stack 12 is facilitated.

Further, since the rotation number of the air pump 50 is maintained at a certain level, for example, it is possible to effectively reduce the noise or the like which may be generated if the rotation number of the air pump 50 changes before power generation of the fuel cell stack 12.

Figure 4:
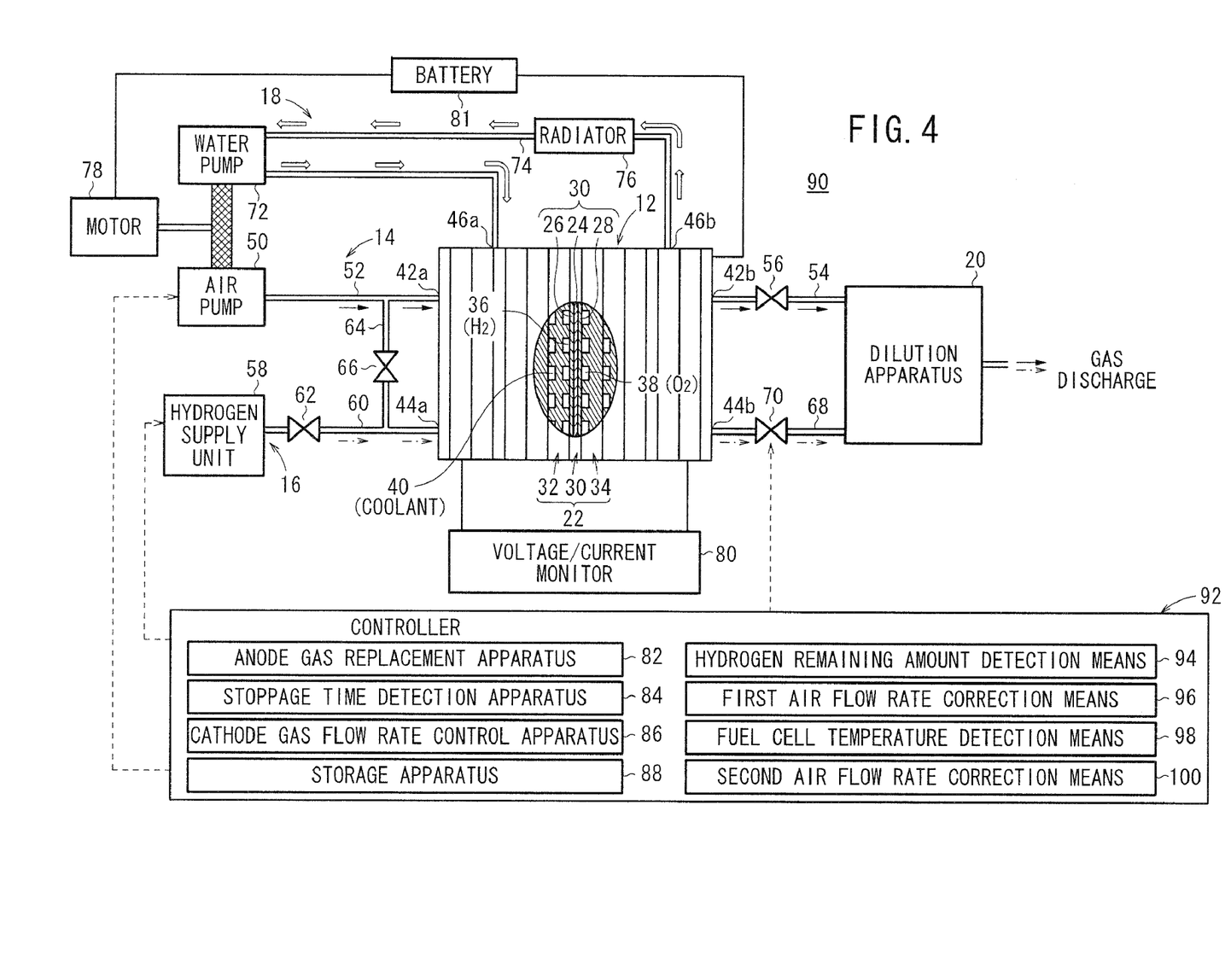
FIG. 4 is a diagram schematically showing structure of a fuel cell system for carrying out a method of starting operation according to a second embodiment of the present invention.

FIG. 4 is a diagram schematically showing structure of a fuel cell system 90 for carrying out a method of staring operation according a second embodiment of the present invention. The constituent elements that are identical to those of the fuel cell system 10 according to the first embodiment are labeled with the same reference numerals, and descriptions thereof will be omitted.

The fuel cell system 90 has a controller 92. The controller 92 includes means for detecting the amount of hydrogen remaining in the fuel cell stack 12 when the fuel cell stack 12 was stopped last time (remaining hydrogen amount detection means 94), means for correcting a control map (air flow rate) based on the amount of the remaining hydrogen (first air flow rate correction means 96), means for detecting the temperature of the fuel cell stack 12 at the time of starting operation of the fuel cell stack 12 (fuel cell temperature detection means 98), and means for correcting the control map (air flow rate) based on the temperature of the fuel cell stack 12 (second air flow rate correction means 100). It should be noted that single means may be used as the first air flow rate correction means 96 and the second air flow rate correction means 100.

Figure 5:
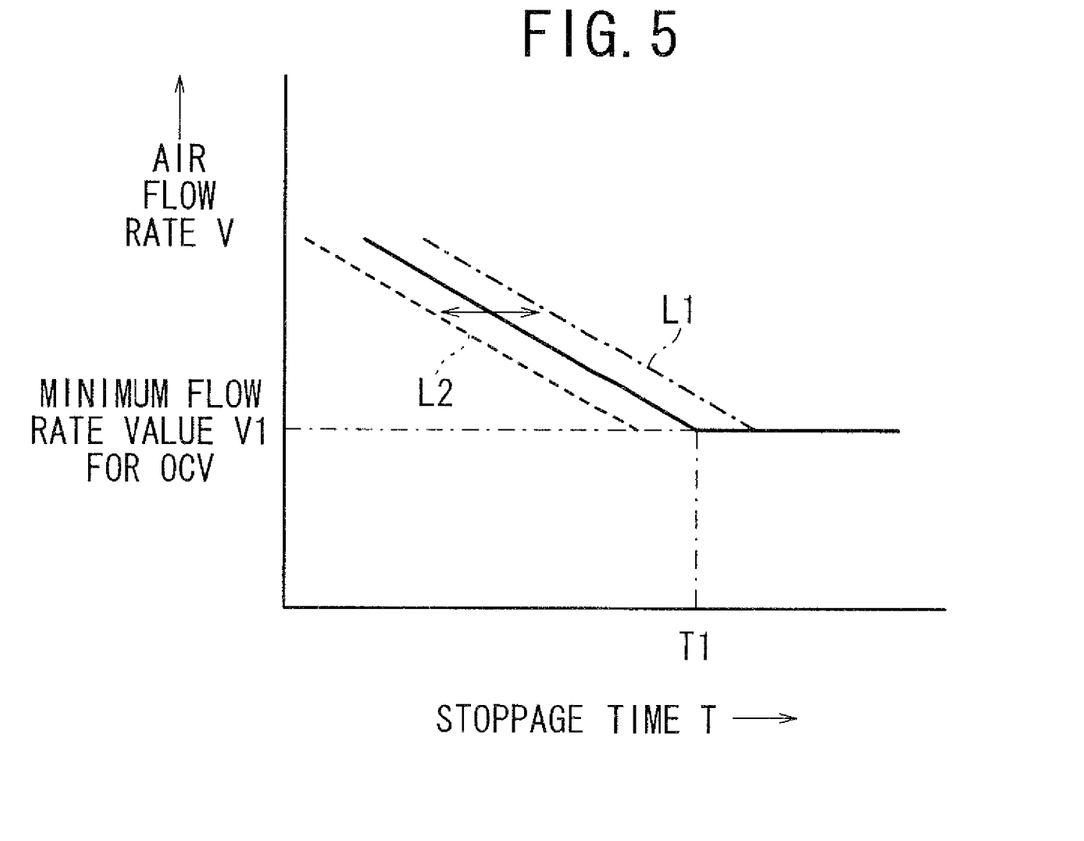
FIG. 5 is a control map showing the correspondence between the stoppage time and the air flow rate.

As can be seen from FIG. 5 showing a linear function between the predetermined air flow rate and the stoppage time, corrections by the first and second air flow rate correction means 96, 100 are made such that the air flow rate is increased (see sloping line L1) or the air flow rate is decreased (see sloping line L2).

The remaining hydrogen amount detection means 94 detects the amount of remaining hydrogen based on, e.g., the pressure of the hydrogen remaining in the fuel cell stack 12, and the fuel cell temperature detection means 98 detects the temperature of the fuel cell stack 12 by a temperature sensor or the like. The temperature of the fuel cell stack 12 may be detected based on the temperature of the coolant, the temperature of the hydrogen, or the temperature of the air. Otherwise, the temperature of the fuel cell stack 12 may be detected directly.

Figure 6:
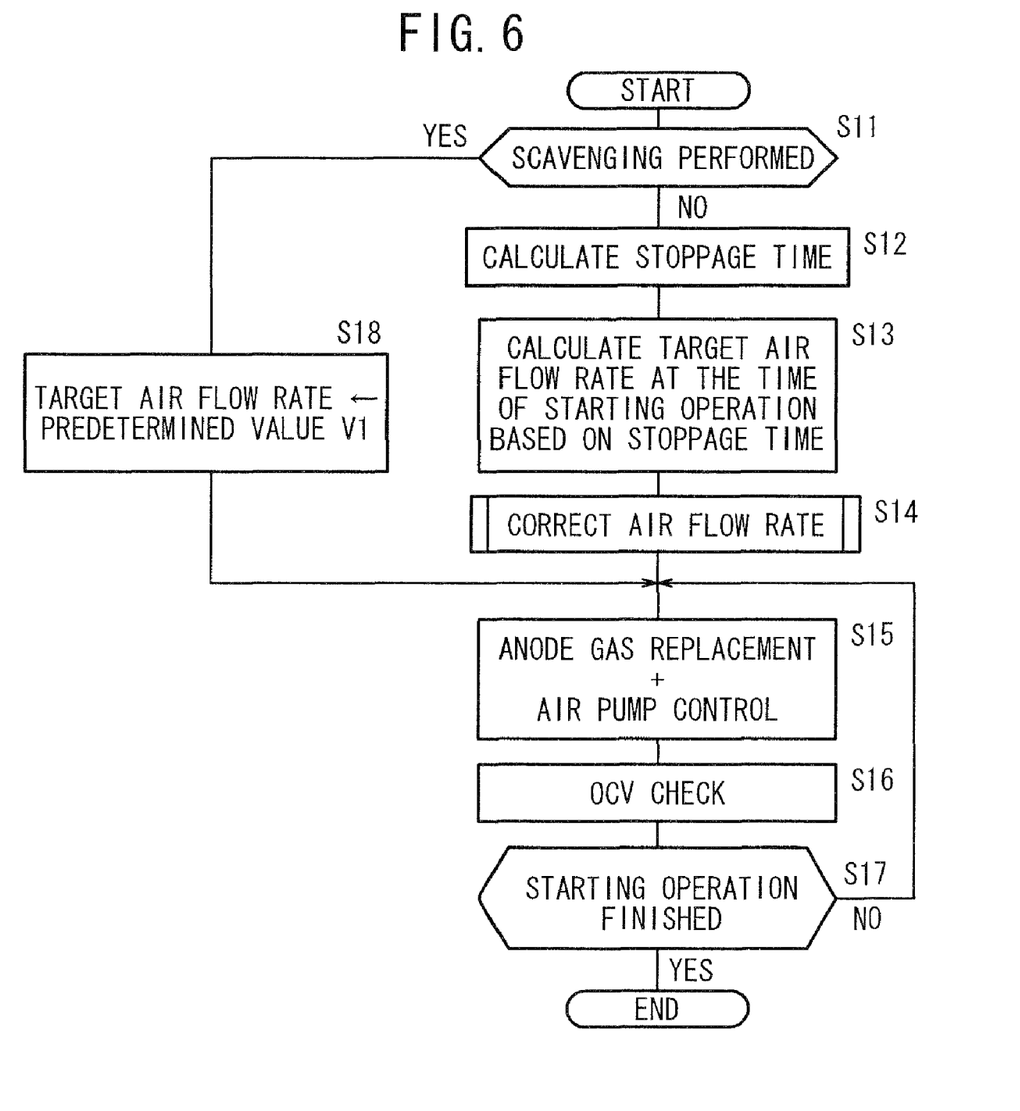
FIG. 6 is a flow chart showing the operation starting method.

Next, operation in the second embodiment will be descried with reference to a flow chart shown in FIG. 6.

Firstly, steps S11 to S13 are carried out in the same manner as steps S1 to S3 in the first embodiment. Then, the process proceeds to step S14, and the process of correcting the air flow rate (air flow rate correction process) is performed.

Figure 7:
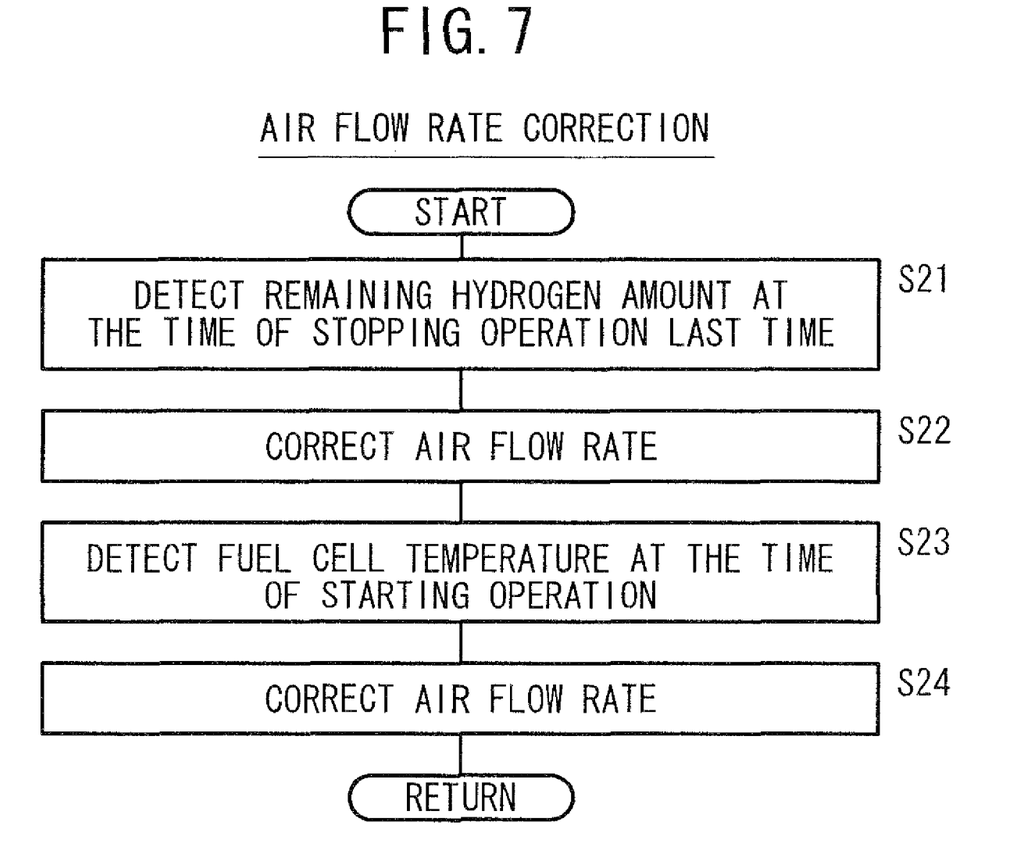
FIG. 7 is a flow chart showing a process of correcting the air flow rate.

In the air flow rate correction process, as shown in FIG. 7, the amount of hydrogen remaining in the fuel cell stack 12 when operation of the fuel cell stack 12 was stopped last time is detected (step S21). Based on the detected remaining hydrogen amount, the air flow rate is corrected as shown in FIG. 5 (step S22). That is, the air flow rate needs to be increased when the remaining hydrogen amount is large. For example, the air flow rate is corrected in a direction toward the sloping line L1.

Then, the process proceeds to step S23, and the temperature of the fuel cell stack 12 at the time of starting operation of the fuel cell stack 12 is detected. Based on the detected temperature, the air flow rate is corrected (step S24). The volume of the air passing through the fuel cell stack 12 becomes larger when the temperature of the fuel cell stack 12 at the time of starting operation of the fuel cell stack 12 is higher. Therefore, in the case where the temperature of the fuel cell stack 12 at the time of starting operation of the fuel cell stack 12 is high, the air flow rate is corrected such that the flow rate of the air from the air pump 50 is decreased, e.g., in a direction toward the sloping line L2 in FIG. 5.

In the air flow rate correction process, instead of the above process, the air flow rate may be corrected, e.g., based on the temperature of the fuel cell stacks 12 when the fuel cell stack 12 is stopped, or the temperature change during stoppage. After the above air flow rate correction process is performed, the steps S15 to S18 are performed in the same manner as the steps S4 to S7 in the first embodiment.

Thus, in the second embodiment, for example, based on the remaining hydrogen amount or the temperature of the fuel cell stack 12, the air pump 50 is controlled highly accurately. Accordingly, energy consumption for hydrogen dilution is reduced effectively, and the dilution process is performed reliably.

Figure 8:
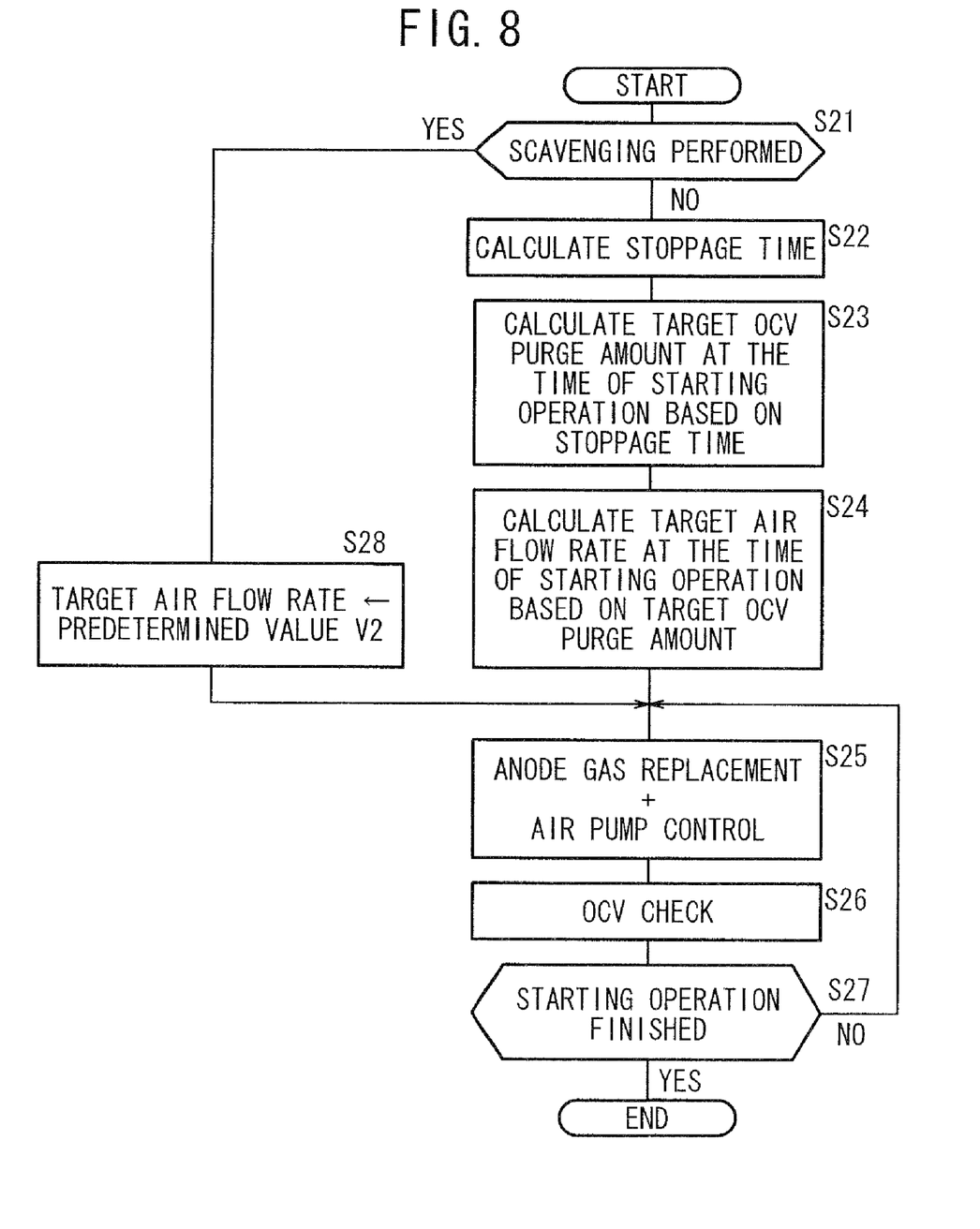
FIG. 8 is a flow chart showing an operation starting method according to a third embodiment of the present invention.

Next, an operation starting method according to a third embodiment of the present invention will be described with reference to a flow chart in FIG. 8. In the third embodiment, as in the case of the first embodiment, the fuel cell system 10 is used.

Firstly, after steps S21 and S22 are performed, the process proceeds to step S23, and the target OCV purge amount at the time of starting operation is calculated based on the calculated stoppage time. Then, the target air flow rate at the time of starting operation is calculated based on the calculated target OCV purge amount at the time of starting operation (step S24).

Figure 9:
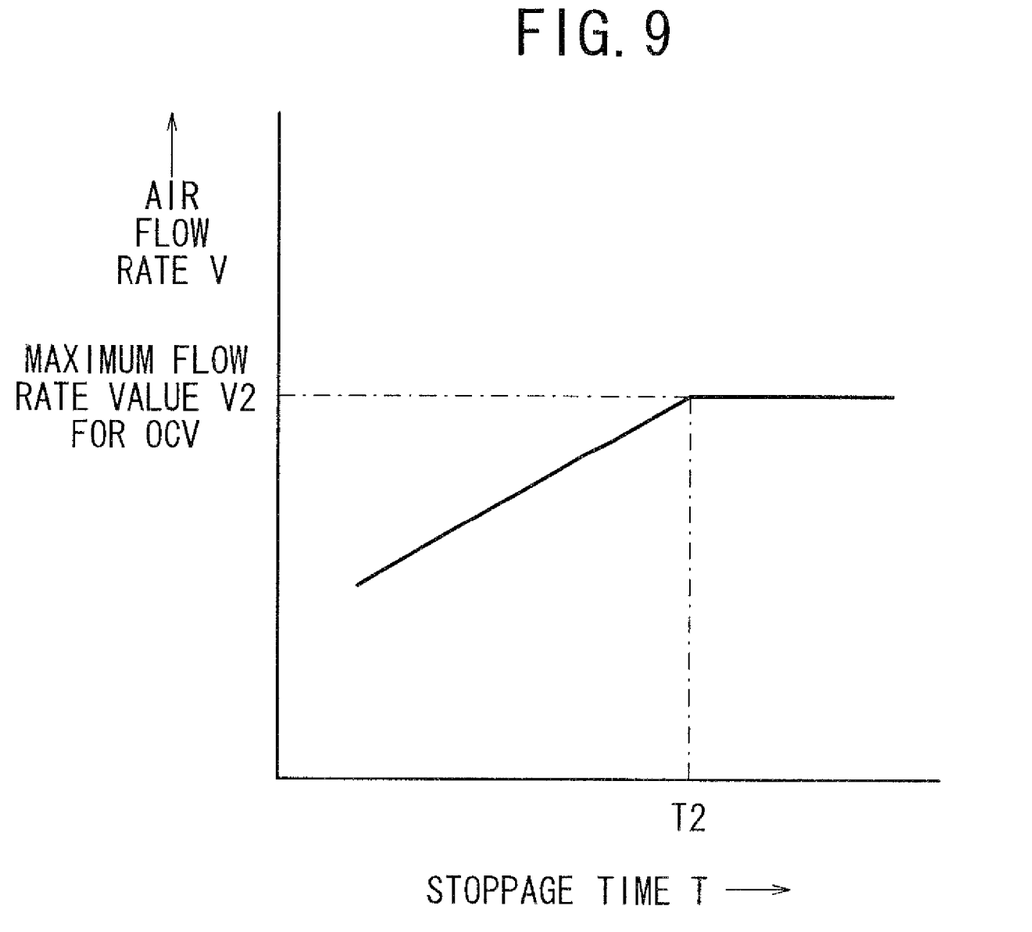
FIG. 9 is a control map showing the correspondence between the stoppage time and the air flow rate.

At this time, a control map showing the correspondence between the stoppage time and the target OCV purge amount at the time of starting operation is stored in the controller 21 beforehand. In this control map, as shown in FIG. 9, as the stoppage time is reduced, the air flow rate is decreased. If the stoppage time exceeds predetermined time T2 (several hours), the air flow rate is set to the maximum flow rate value V2 required at the time of OCV. It is because, if the stoppage time is short, the hydrogen concentration in the anode gas channel system is relatively large. Therefore, the amount of hydrogen replaced by OCV purging is reduced, and accordingly the required flow rate is small. It should be noted that the maximum flow rate value V2 is the same as the predetermined value V2 in the case where scavenging is performed during stoppage.

Further, steps S25 to S28 are performed in the same manner as the steps S4 to S7 in the first embodiment.

Therefore, in the third embodiment, the air flow rate is controlled depending on the amount of the hydrogen remaining in the anode gas channel system. Thus, the same advantages as in the case of the first embodiment are obtained. For example, energy consumption is reduced effectively.

Figure 10:
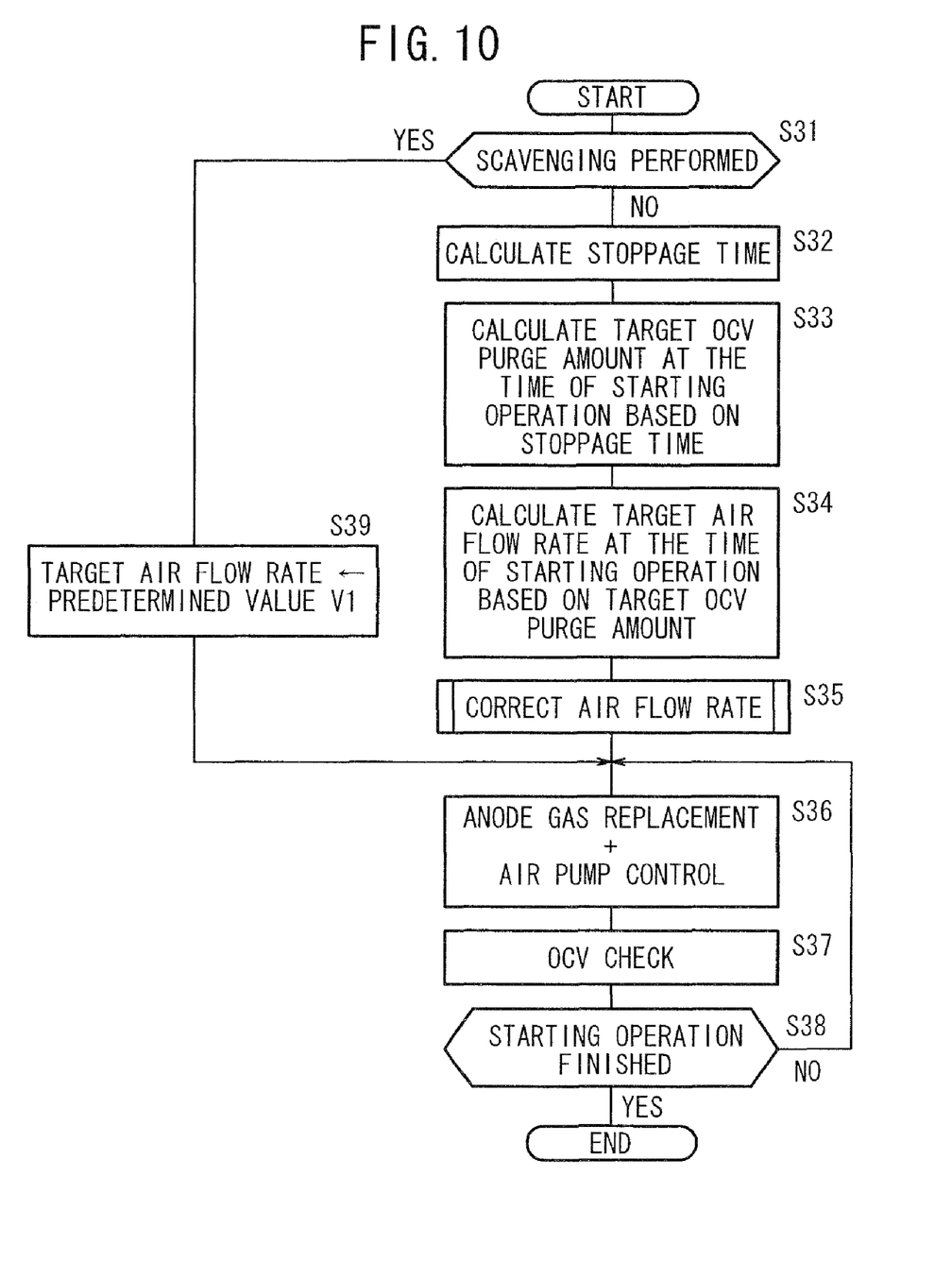
FIG. 10 is a flow chart showing an operation starting method according to a fourth embodiment of the present invention.

Next, an operation starting method according to a fourth embodiment of the present invention will be described with reference to a flow chart in FIG. 10. In the fourth embodiment, as in the case of the second embodiment, the fuel cell system 90 is used.

Figure 11:
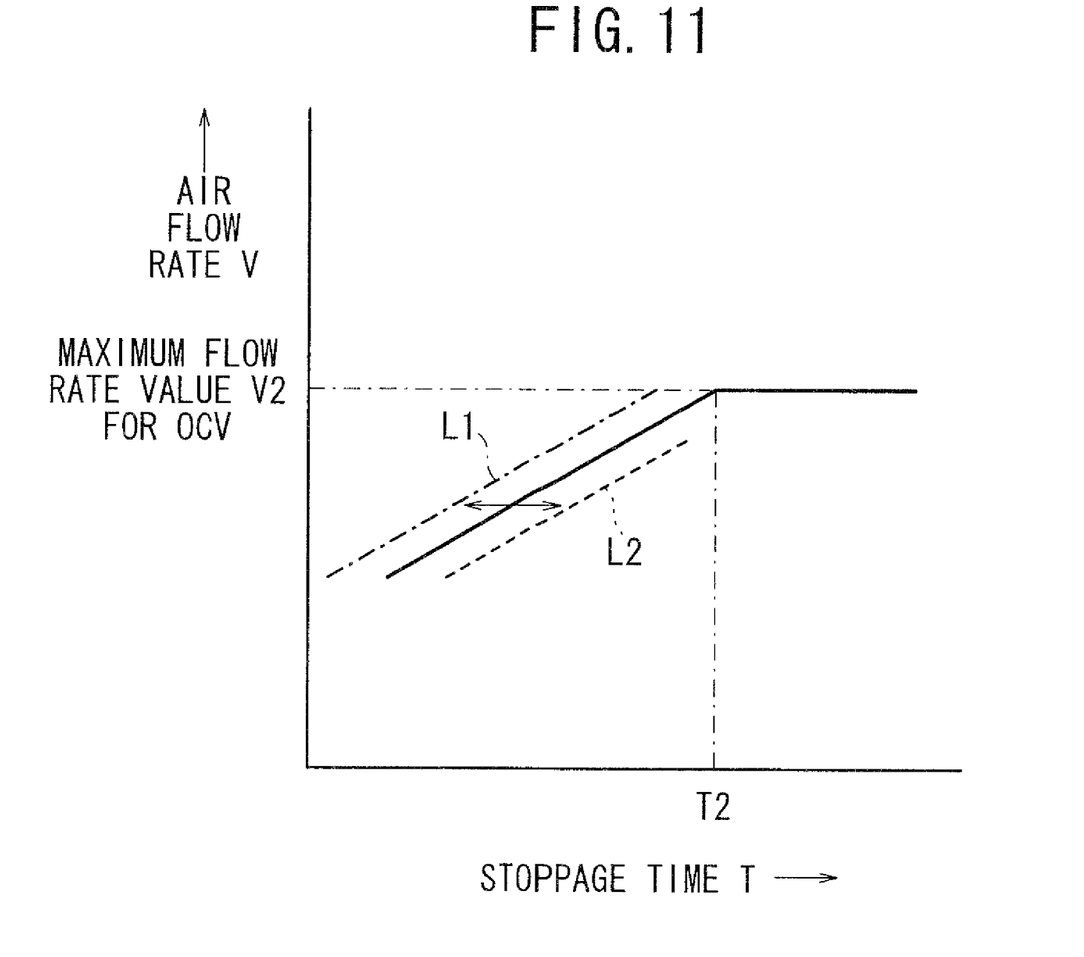
FIG. 11 is a control map showing the correspondence between the stoppage time and the air flow rate.

Firstly, steps S31 to S34 are carried out in the same manner as in the case of steps S21 to S24 in the third embodiment. Thereafter, the process proceeds to step S35, and the air flow rate correction process is performed (see FIG. 11).

Accordingly, in the fourth embodiment, the same advantages as in the case of the second embodiment are obtained. For example, energy consumption for hydrogen dilution is reduced effectively, and the dilution process is performed reliably.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell system comprising:
  a fuel cell for generating electricity by electrochemical reactions of a cathode gas supplied to a cathode gas channel and an anode gas supplied to an anode gas channel;
  a cathode gas supply apparatus for supplying the cathode gas;
  an anode gas supply apparatus for supplying the anode gas;
  an anode gas replacement apparatus for replacing the anode gas in the anode gas channel by the anode gas supply apparatus at the time of starting operation of the fuel cell;
  a dilution apparatus for diluting an anode off gas discharged from the fuel cell by mixing the anode off gas with the cathode gas supplied from the cathode gas supply apparatus;
  a stoppage time detection apparatus for detecting a stoppage time during which operation of the fuel cell is stopped; and
  a cathode gas flow rate control apparatus for changing the flow rate of the cathode gas supplied from the cathode gas supply apparatus depending on the stoppage time, at the time of replacing the anode gas by the anode gas replacement apparatus.

2. The fuel cell system according to claim 1, wherein the cathode gas flow rate control apparatus has a control map for increasing the flow rate of the cathode gas as the stoppage time is reduced.

3. The fuel cell system according to claim 1, wherein at the time of scavenging of the anode gas channel using the cathode gas during stoppage, the cathode gas flow rate control apparatus sets the flow rate of the cathode gas at the time of replacing the anode gas to the minimum flow rate value required at the time of open circuit voltage (OCV).

4. The fuel cell system according to claim 1, wherein, if the stoppage time is a predetermined time or more, the cathode gas flow rate control apparatus sets the flow rate of the cathode gas at the time of replacing the anode gas to the minimum flow rate value required at the time of OCV.

5. The fuel cell system according to claim 1, wherein the cathode gas flow rate control apparatus has a control map for decreasing the flow rate of the cathode gas as the stoppage time is reduced.

6. The fuel cell system according to claim 1, wherein at the time of scavenging of the anode gas channel using the cathode gas during stoppage, the cathode gas flow rate control apparatus sets the flow rate of the cathode gas at the time of replacing the anode gas to the maximum flow rate value required at the time of OCV.

7. The fuel cell system according to claim 1, wherein, if the stoppage time is a predetermined time or more, the cathode gas flow rate control apparatus sets the flow rate of the cathode gas at the time of replacing the anode gas to the maximum flow rate value required at the time of OCV.

8. The fuel cell system according to claim 1, further comprising:
  means for detecting an amount of the anode gas remaining in the fuel cell at the time when operation of the fuel cell system was stopped last time; and
  means for correcting the flow rate of the cathode gas at the time of replacing the anode gas based on the amount of the remaining anode gas.

9. The fuel cell system according to claim 1, further comprising:
  means for detecting a temperature of the fuel cell at the time of starting operation of the fuel cell system; and
  means for correcting the flow rate of the cathode gas at the time of replacing the anode gas based on the temperature of the fuel cell.

10. The fuel cell system according to claim 1, further comprising a coolant supply apparatus for supplying a coolant to the fuel cell,
  wherein a water pump of the coolant supply apparatus and an air pump of the cathode gas supply apparatus are operated coaxially.

11. The fuel cell system according to claim 10, wherein the air pump is operated at a constant rotation speed.

12. The fuel cell according to claim 10, wherein the air pump is operated by electrical energy supplied from a battery.

13. A method of starting operation of a fuel cell system comprising:
  a fuel cell for generating electricity by electrochemical reactions of a cathode gas supplied to a cathode gas channel and an anode gas supplied to an anode gas channel;
  a cathode gas supply apparatus for supplying the cathode gas;
  an anode gas supply apparatus for supplying the anode gas;
  an anode gas replacement apparatus for replacing the anode gas in the anode gas channel by the anode gas supply apparatus at the time of starting operation of the fuel cell; and
  a dilution apparatus for diluting an anode off gas discharged from the fuel cell by mixing the anode off gas with the cathode gas supplied from the cathode gas supply apparatus, the method comprising the steps of:
  detecting a stoppage time during which operation of the fuel cell is stopped; and
  changing the flow rate of the cathode gas supplied from the cathode gas supply apparatus depending on the stoppage time, at the time of replacing the anode gas by the anode gas replacement apparatus.

14. The method of starting operation according to claim 13, wherein the flow rate of the cathode gas is increased as the stoppage time is reduced.

15. The method of starting operation according to claim 13, wherein at the time of scavenging of the anode gas channel using the cathode gas during stoppage, the flow rate of the cathode gas at the time of replacing the anode gas is set to the minimum flow rate value required at the time of OCV.

16. The method of starting operation according to claim 13, wherein, if the stoppage time is a predetermined time or more, the flow rate of the cathode gas at the time of replacing the anode gas is set to the minimum flow rate value required at the time of OCV.

17. The method of starting operation according to claim 13, wherein the flow rate of the cathode gas is decreased as the stoppage time is reduced.

18. The method of starting operation according to claim 13, wherein at the time of scavenging of the anode gas channel using the cathode gas during stoppage, the flow rate of the cathode gas at the time of replacing the anode gas is set to the maximum flow rate value required at the time of OCV.

19. The method of starting operation according to claim 13, wherein, if the stoppage time is a predetermined time or more, the flow rate of the cathode gas at the time of replacing the anode gas is set to the maximum flow rate value required at the time of OCV.

20. The method of starting operation according to claim 13, further comprising the steps of:
 detecting an amount of the anode gas remaining in the fuel cell at the time when operation of the fuel cell system was stopped last time; and
 correcting the flow rate of the cathode gas at the time of replacing the anode gas based on the amount of the remaining anode gas.

21. The method of starting operation according to claim 13, further comprising the steps of:
 detecting a temperature of the fuel cell at the time of starting operation of the fuel cell system; and
 correcting the flow rate of the cathode gas at the time of replacing the anode gas based on the temperature of the fuel cell.

\* \* \* \* \*

UNITED STATES PATENT AND TRADEMARK OFFICE
CERTIFICATE OF CORRECTION

| | | |
|---|---|---|
| PATENT NO. | : 8,097,372 B2 | Page 1 of 1 |
| APPLICATION NO. | : 12/410326 | |
| DATED | : January 17, 2012 | |
| INVENTOR(S) | : Kenichiro Ueda et al. | |

It is certified that error appears in the above-identified patent and that said Letters Patent is hereby corrected as shown below:

Cover Page:

Item 73 should read

-- Kenichiro Ueda, Utsunomiya (JP) --

Signed and Sealed this
Seventeenth Day of April, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,097,372 B2 | Page 1 of 1 |
| APPLICATION NO. | : 12/410326 | |
| DATED | : January 17, 2012 | |
| INVENTOR(S) | : Kenichiro Ueda et al. | |

It is certified that error appears in the above-identified patent and that said Letters Patent is hereby corrected as shown below:

Cover Page:

Item (75) first inventor should read

-- Kenichiro Ueda, Utsunomiya (JP) --

This certificate supersedes the Certificate of Correction issued April 17, 2012.

Signed and Sealed this
Third Day of July, 2012

David J. Kappos
*Director of the United States Patent and Trademark Office*